Dec. 18, 1956  M. C. MATTHEWS  2,774,897
STATOR AND METHOD OF MAKING SAME
Filed July 8, 1953  2 Sheets-Sheet 1
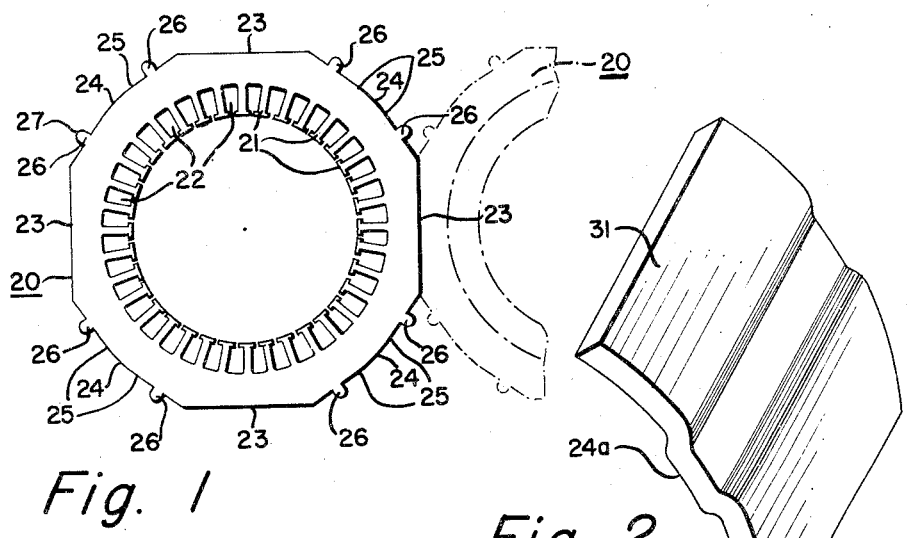
Fig. 1
Fig. 2
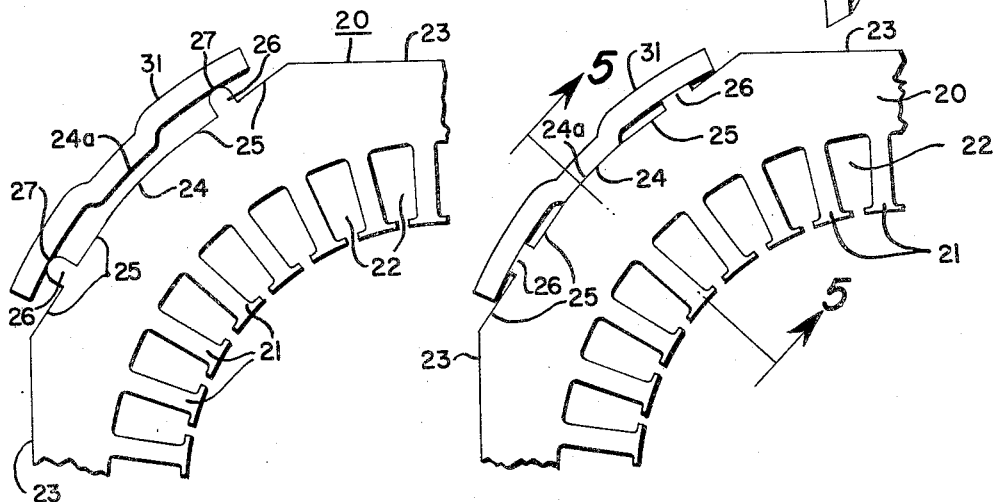
Fig. 3
Fig. 4
INVENTOR.
Milton C. Matthews
BY
His Attorney Dec. 18, 1956　　　M. C. MATTHEWS　　　2,774,897
STATOR AND METHOD OF MAKING SAME Filed July 8, 1953　　　　　　　　　　2 Sheets-Sheet 2

INVENTOR.
Milton C. Matthews
BY
His Attorney

United States Patent Office 2,774,897
Patented Dec. 18, 1956

2,774,897
STATOR AND METHOD OF MAKING SAME

Milton C. Matthews, Rochester, N. Y., assignor to General Motors Corporation, Detroit, Mich., a corporation of Delaware Application July 8, 1953, Serial No. 366,680

8 Claims. (Cl. 310—217)

This invention relates to improvements in laminated core constructions for electrical devices and more particularly to an improved toothed magnetic flux carrying stator construction for receiving coils and the method of making same.

Various means have heretofore been used for maintaining stator laminae in assembled relation, one of the most simple and inexpensive of these for maintaining the stator laminae in assembled relation is to weld the peripheral edges of laminae along lines parallel to the axis of the stator.

An object of the present invention is to provide an improved and simplified laminated stator construction for electrical devices. This object is accomplished by forming the laminae with tabs and uniting the tabs with a plurality of struts or binding members by projection welding. By providing the laminations with tabs the welding current distribution is better.

Another object of the invention is to provide struts or securing members of a character which will allow easy machining of the ends thereof to which end members or frames are fastened in such a way as to support the armature so as to provide concentricity of the armature and the proper air gap.

Further objects and advantages of the present invention will be apparent from the following description reference being had to the accompanying drawings wherein a preferred embodiment of the present invention is clearly shown.

In the drawings:

Fig. 1 is a plan view of a preferred type of field lamina.

Fig. 2 is a perspective view of a strut used with the stator.

Fig. 3 is a fragmentary view of the stator showing one of the struts prior to securing same to the stator.

Fig. 4 is a view similar to Fig. 3 but showing the strut attached to the stator.

Figure 5:
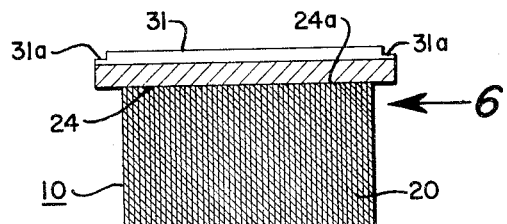
Fig. 5 is a sectional view taken on line 5—5 of Fig. 4.
Figure 6:
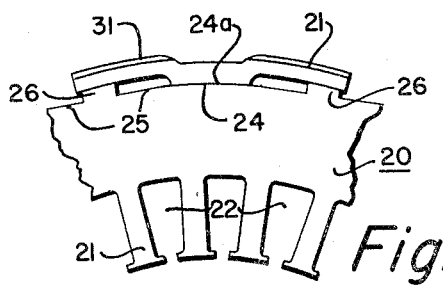
Fig. 6 is a view looking in the direction of arrow 6 of Fig. 5.
Figures 8, 9:
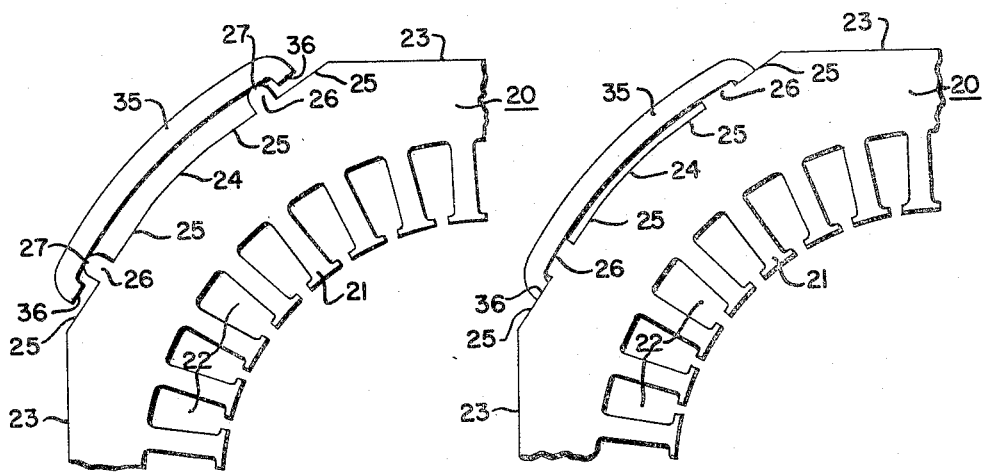
Fig. 8 is a view showing the modification of the strut prior to being secured to stator.
Fig. 9 is a view showing the modification of the strut shown in Fig. 7 secured to the stator.

Referring to Figs. 5 and 6 a fragment of a stator 10 is shown which includes a plurality of laminae 20 shown in Fig. 1. The laminae are formed of metal of high magnetic permeability and held in assembled relation by corner members or struts 31. Each lamina 20 is cut by punching dies and is formed with the usual central opening for an armature, not shown, and a plurality of radial wire slots 22 in which the field windings, not shown, are inserted. The laminae are also formed with straight parallel sides 23 so as to produce laminae whose shape is that of a rectangle. The corners are cut in the shape shown to provide stop surfaces 24 and flat portions 25 on opposite sides of the stop 24. Each portion 25 has a tab or projection 26 extending therefrom and the tabs have rounded surfaces 27. In the illustrated construction, eight of these tabs are provided two at each corner, and these tabs extend radially outward beyond the dimensions of the stator. It is to be understood that the rounded formation of the tabs could be of other suitable formation. The rounded end of the tabs provides an ideal edge for projection welding.

In order to provide a rigid construction, the laminae are secured together by the metallic members or struts 31 which are in effect binding members. The members 31 are located at the corners of the laminae. The plates 31 which secure the laminae together are punched from sheet metal and are curved transversely on an arc. The struts are formed with a channel to provide stop surfaces 24a which are adapted to engage the stops 24 on the laminae. The struts 31 are preferably slightly longer than the width of the stack of laminae so that the opposite ends thereof will project beyond the stator 10 see Fig. 5. In order to concentrically support end members, not shown, and thus carry a rotor or armature in the center of the openings 21 in the laminae to form the stator 10, the end of the members 31 are machined to provide arcuate surfaces 31a arranged in a circular plane concentric to the axis of the stator openings 21. Therefore, when the end members on opposite ends of the stator 10 are placed in position on the struts the end members will be in axial alignment.

In forming the stator 10 the required number of laminae 20 are first assembled on top of each other on a mandrel with the tabs in accurate alignment and then the laminae are compressed by suitable means, such as a press, in order to provide a compact stack of laminae, and while in this condition, the required number of struts or members 31 are positioned a definite distance apart about the periphery of the stator 10 with the inner arcuate surface of each plate in contact with two of the tabs and having the stop surface 24a of the plates opposite the stop surfaces 24 of the laminae 20. When the struts 31 are in the correct positions they are fixed to the tabs 26 of the laminae by a projection welding operation.

While the welding may be done in any desired manner, welding circuit, not shown, suitable for welding the struts to the laminae in this instance, includes a welding transformer provided with a primary coil and a secondary coil. The leads of the coils are connected with movable electrodes. The electrodes are operable so that they engage the plates and apply pressure circumferentially in opposed direction to the struts 31 to hold same in good contact with the tabs 26. While pressure is being applied to the struts by the electrodes the welding current is turned on and the plates are united with the tabs by projection welding by virtue of the rounded surfaces of the tabs which engage the plates melt. The space on each side of the tabs limit the conduction of heat away from the tabs 26 and in addition cause a more rapid heating of the rounded portions of the tabs which fuse with the struts 31. As the tabs melt the plastic metal will flow in the spaces as the plates move toward the laminae. When the surfaces 24a of the struts 31 engage the stop surfaces 24 the plates stop and then the welding current is turned off. The fusion of the tabs 26 with the struts 31 in the welding operation also reduces the tendency to change the magnetic properties of the material of which the laminae are made.

Figure 7:
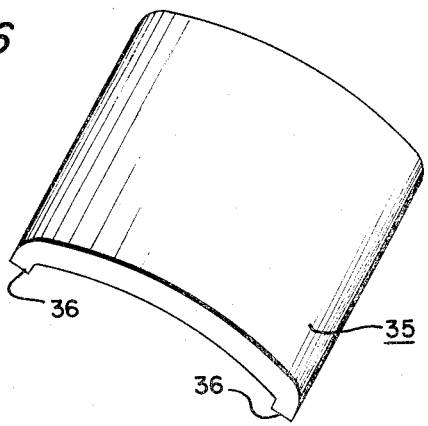
Fig. 7 is a modification of a strut in perspective.

Fig. 7 shows a modified form of struts or binding members 35. Instead of forming the struts with a channel to form the stop surface 31a the side edges 36 of the plates may be bent to form a channel. In that case the edges 36 form the stop surfaces. When the plates are fixed to the tabs, the bent edges 36 will engage the portions 25 of the laminae to limit the movement of the plates 35 toward the laminae.

While the embodiment of the present invention as herein disclosed, constitutes a preferred form, it is to be understood that other forms might be adopted.

What is claimed is as follows:

1. A stator for a dynamoelectric machine comprising a stack of metal laminae having a plurality of pairs of peripheral tabs; said tabs extending outwardly beyond the general periphery of the laminae, said tabs of each pair being arranged in a straight line which are parallel to the axis of the stator; a plurality of metal binding members located adjacent each pair of tabs and retaining the stack in assembled relation; said tabs being mashed by the members by an electrical projecting welding operation which unites said tabs with the binding members whereby the laminae are held in assembled relationship.

2. A stator for a dynamoelectric machine comprising a stack of metal laminae each of which being an internally slotted ring and the exterior of which has corners provided with a pair of spaced projections and having straight portions between adjacent corners, said straight portions defining a rectangle; a plurality of metal binding members located adjacent the corners and contacting the projections and retaining the stack in assembled relation, each member having an inwardly extending channeled portion constituting a stop, said projections being melted by a projection welding operation which unites said projections with the members, said stops of said members limiting the movement of the member toward the laminae.

3. A stator for a dynamoelectric machine comprising a stack of metal laminae each of which being an internally slotted ring and the exterior of which is provided with a plurality of projections extending beyond the outer periphery of the laminations; a plurality of circumferentially spaced arcuate binding members located adjacent the outer ends of the projections and retaining the stack in assembled relations, each member including an inwardly extending channeled portion constituting a stop, said projections being partially melted by a projection welding operation which unites the laminae with the members, said stops operating to limit the movement of the members toward the laminae during the welding operation whereby the member will be arranged in a circular plane with respect to each other.

4. A stator for a dynamoelectric machine comprising a stack of metal laminae each of which has opposite sides parallel and other sides perpendicular thereto and corner portions between adjacent sides, each corner having a pair of integral spaced tabs and projecting outwardly therefrom; and a plurality of metal struts located at the corner portion and adjacent the tabs and retaining the laminae in assembled relation, said tabs being mashed by the struts by an electrical projection welding operation which causes the tabs to melt and unite with struts; each strut having an inwardly extending channeled portion constituting stop means cooperating with portions of the laminae for limiting the movement of the struts toward the laminae during the welding operation.

5. A laminated assembly comprising; a plurality of laminae assembled in stacked relation, each of said lamina consisting of an inscribed generally polygonal shape; a tab extending outwardly from opposed corners thereof and beyond boundry of a circumscribing circle, said tabs being adapted to be aligned with similar tabs of other lamina when the assembly is complete; and a weld coextensive with said tabs and causing said tabs to come within the boundary of the circumscribing circle for securing the assembly.

6. A laminated assembly comprising; a plurality of laminae assembled in stacked relation, each of said lamina consisting of an inscribed generally polygonal shape; a pair of spaced tabs extending outwardly from certain of said sides and beyond the boundary of a circumscribing circle, said tabs being adapted to be aligned with similar tabs of other lamina when the assembly is complete; and a plurality of welds coextensive with said tabs and causing said tabs to come within the boundary of the circumscribing circle, said welds securing the assembly.

7. A stator in accordance with claim 3 wherein the channeled portion of each arcuate binding member is disposed between the side surfaces thereof.

8. A stator in accordance with claim 3 wherein the channeled portion of each arcuate binding member is constituted by the side edges thereof.

References Cited in the file of this patent

UNITED STATES PATENTS

| 1,874,415 | Atwood | Aug. 30, 1932 |
| 2,306,180 | Myers et al. | Dec. 22, 1942 |
| 2,448,785 | Dolan | Sept. 7, 1948 |
| 2,582,005 | Carlson | Jan. 8, 1952 |

FOREIGN PATENTS

| 669,078 | Great Britain | Mar. 26, 1952 |